(12) United States Patent
Peng et al.

(10) Patent No.: US 9,841,792 B2
(45) Date of Patent: Dec. 12, 2017

(54) CHASSIS WITH FASTENING APPARATUS

(71) Applicants: HONGFUJIN PRECISION ELECTRONICS (TIANJIN) CO.,LTD., Tianjin (CN); HON HAI PRECISION INDUSTRY CO., LTD., New Taipei (TW)

(72) Inventors: Wen-Tang Peng, New Taipei (TW); Guang-Yi Zhang, Shenzhen (CN); Xiao-Zheng Li, Shenzhen (CN)

(73) Assignees: HONGFUJIN PRECISION ELECTRONICS (TIANJIN) CO., LTD., Tianjin (CN); HON HAI PRECISION INDUSTRY CO., LTD., New Taipei (TW)

( * ) Notice: Subject to any disclaimer, the term of this patent is extended or adjusted under 35 U.S.C. 154(b) by 84 days.

(21) Appl. No.: 15/090,774

(22) Filed: Apr. 5, 2016

(65) Prior Publication Data

US 2017/0269645 A1  Sep. 21, 2017

(30) Foreign Application Priority Data

Mar. 21, 2016  (CN) .......................... 2016 1 0159719

(51) Int. Cl.
 *G06F 1/18* (2006.01)

(52) U.S. Cl.
 CPC .............. *G06F 1/187* (2013.01); *G06F 1/181* (2013.01)

(58) Field of Classification Search
 CPC ...... G06F 1/3221; G06F 3/0689; G06F 1/187; G06F 1/181; G06F 1/185; G06F 3/067; G06F 1/1658; G06F 1/184; G06F 1/188; G06F 13/409; H05K 7/20572; H05K 7/1487; H05K 1/117; H05K 1/141; H05K 7/20727; H05K 7/20809; H05K 1/14; H05K 2201/044; H05K 7/1459; H05K 7/1457; G11B 33/128
 USPC ....................... 361/679.33–679.39, 724–727, 361/679.55–679.58, 730, 747, 752, 788; 312/223.1–223.2
 See application file for complete search history.

(56) References Cited

U.S. PATENT DOCUMENTS

2013/0342988 A1* 12/2013 Peng ....................... G06F 1/187
 361/679.33

* cited by examiner

*Primary Examiner* — Anthony Haughton
*Assistant Examiner* — Ingrid Wright
(74) *Attorney, Agent, or Firm* — Steven Reiss

(57) ABSTRACT

A chassis in a device housing includes a housing of the housing, a hard disk drive, and a fastening apparatus. The housing includes a backplane and a side plate defining an opening. The hard disk drive defining an opening is electrically coupled to the backplane. The fastening apparatus includes a connecting member and a fastening member. The connecting member includes a connecting post. The connecting post defines a mounting hole. Two locking protrusions protrude from the connecting post. A raised portion protrudes from an inside wall of the mounting hole. The fastening member includes an urging portion. The fastening apparatus is coupled between the hard disk drive and the side plate. The fastening member is mounted in the mounting hole, and the raised portion is urged by the urging portions. The connecting post undergoes elastic deformation, and the locking protrusions are locked in the openings.

19 Claims, 7 Drawing Sheets

CHASSIS WITH FASTENING APPARATUS

FIELD

The subject matter herein generally relates to a chassis with a fastening apparatus in a housing for electronic components.

BACKGROUND

A plurality of backplanes are mountable in a chassis, and a plurality of connectors are coupled to each backplane. A plurality of hard disk drives can be coupled to the plurality of connectors.

BRIEF DESCRIPTION OF THE DRAWINGS

Implementations of the present technology will now be described, by way of example only, with reference to the attached figures.

DETAILED DESCRIPTION

Figure 1:
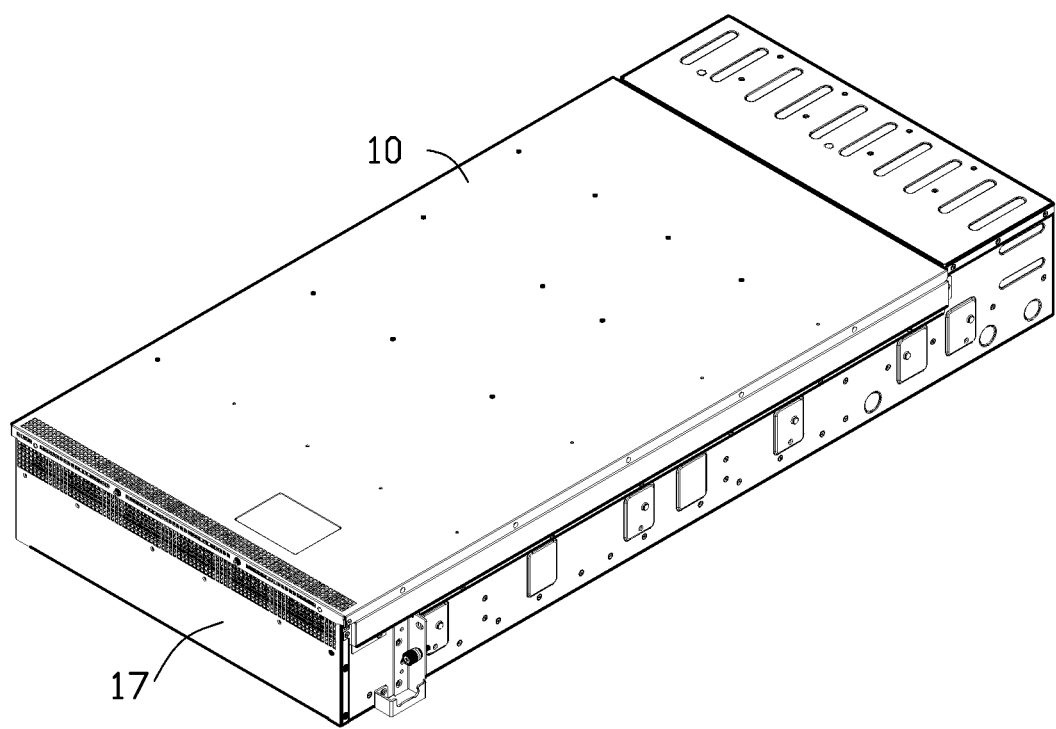
FIG. 1 is an assembled, isometric view of an exemplary embodiment of a chassis in an electronic device which houses electronic components.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of an object is contained within a boundary formed by another object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure relates to a chassis with a fastening apparatus in a housing.

Figure 2:
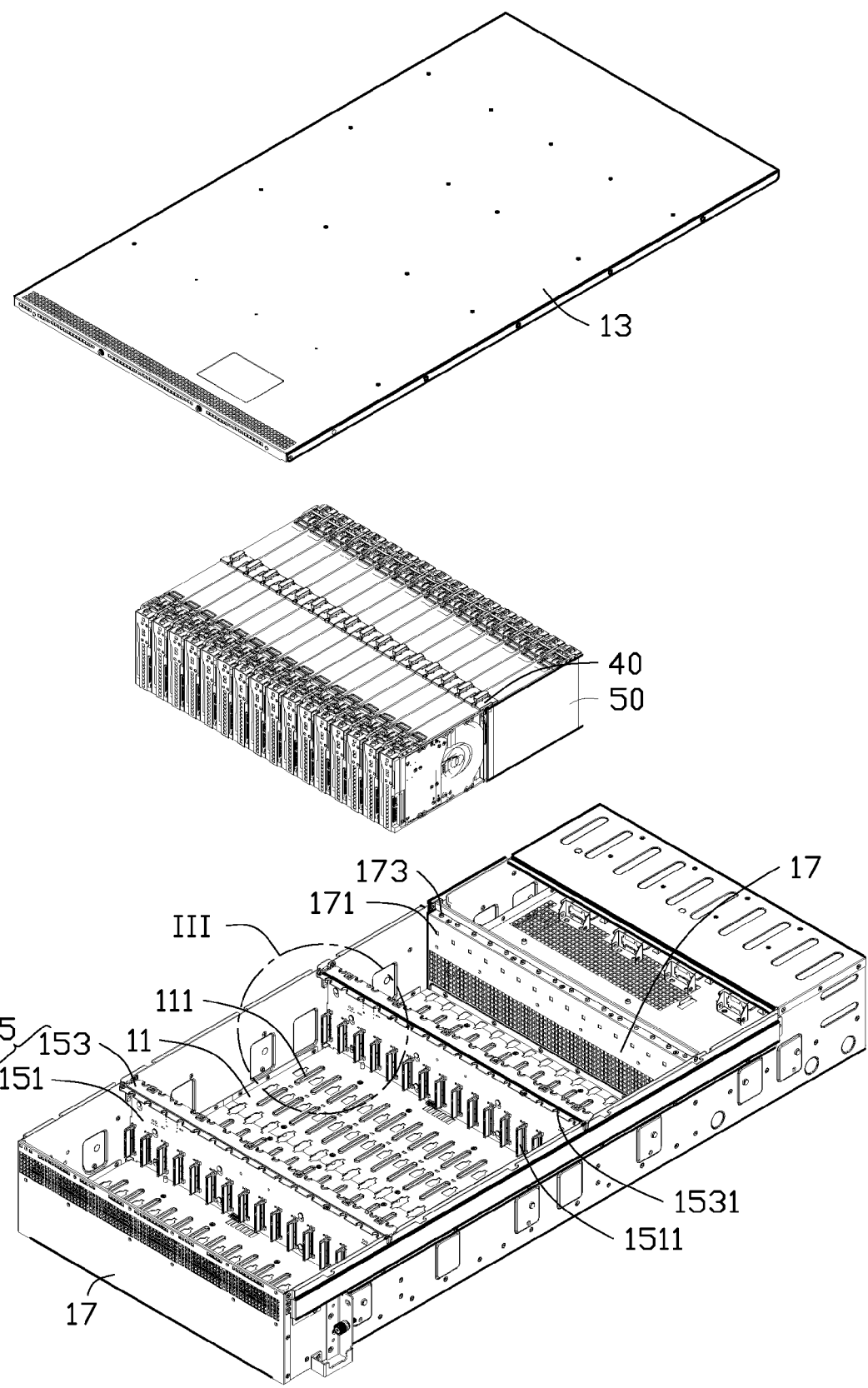
FIG. 2 is an exploded, isometric view of the electronic device of FIG. 1, which comprises a plurality of hard disk drives and fastening apparatus.

FIG. 1 and FIG. 2 illustrate an exemplary embodiment of a chassis. The chassis comprises a housing 10, a plurality of hard disk drives 50 mounted in the housing 10, and a plurality of fastening apparatus 40. The housing 10 comprises a bottom plate 11, a top plate 13, a plurality of backplanes 15 mounted between the bottom plate 11 and the top plate 13, and two side plates 17 parallel to the backplanes 15. All of the plurality of backplanes 15 are parallel to each other.

Figure 3:
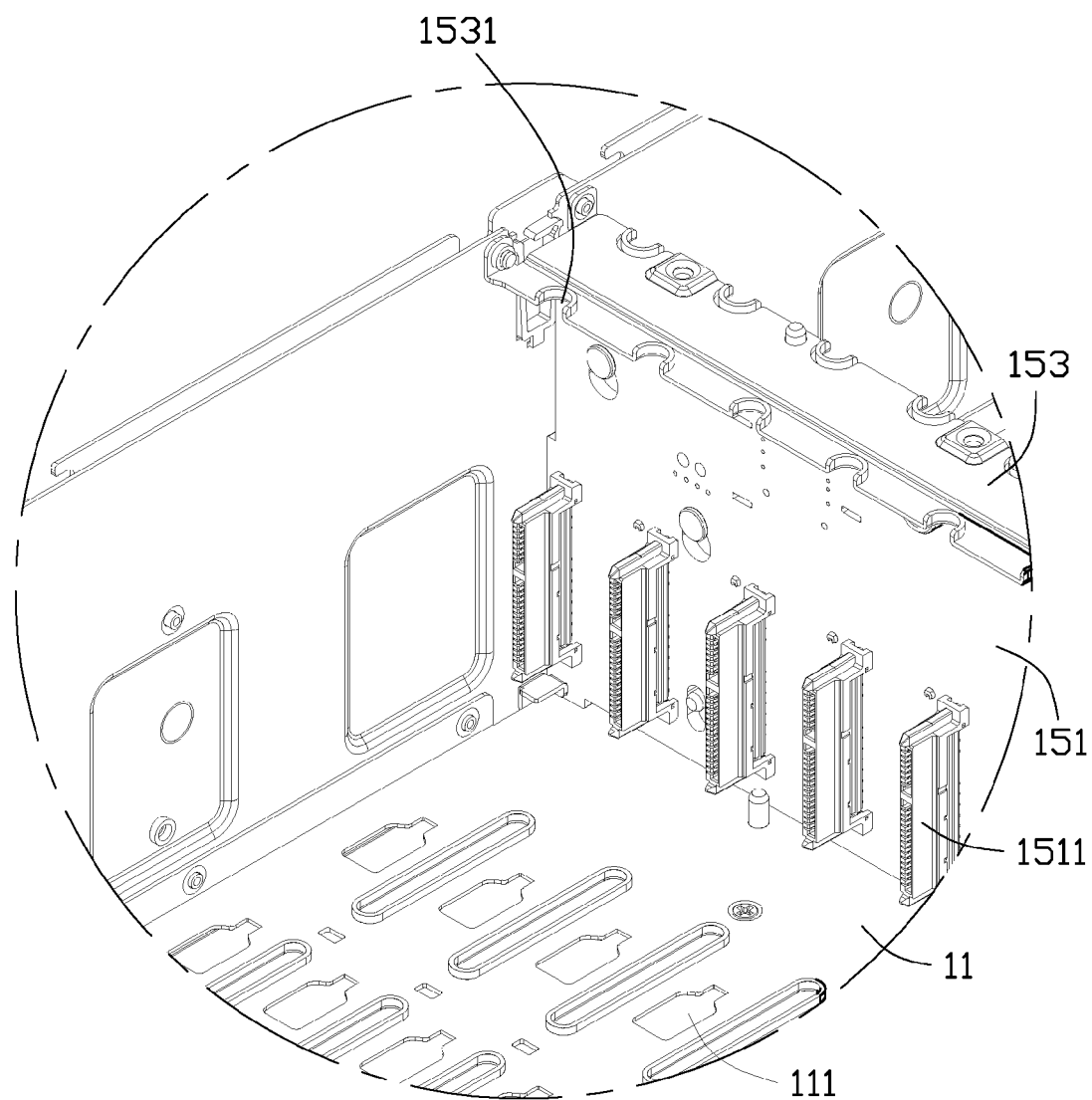
FIG. 3 is an enlarged view of encircled portion III of FIG. 2.

Referring to FIG. 3, the bottom plate 11 defines a plurality of notches 111 between the backplanes 15, and between the backplane 15 and side plate 17. The plurality of notches 111 are parallel to and spaced from each other. Each backplane 15 comprises a connecting plate 151 and a fixing plate 153 parallel to the bottom plate 11. A middle portion of fixing plate 153 is coupled to a top end of the connecting plate 151. Connectors 1511 are coupled to two sides of the connecting plate 151, each connector 1511 being located beside a row of the notches 111. Two sides of each fixing plate 153 define a plurality of arcuate slots 1531 above the notches 111. An inside of each side plate 17 defines a plurality of openings 171 which are spaced from each other. A plurality of raised pillars 173 spaced from each other protrude from a top of each side plate 17.

Figure 4:
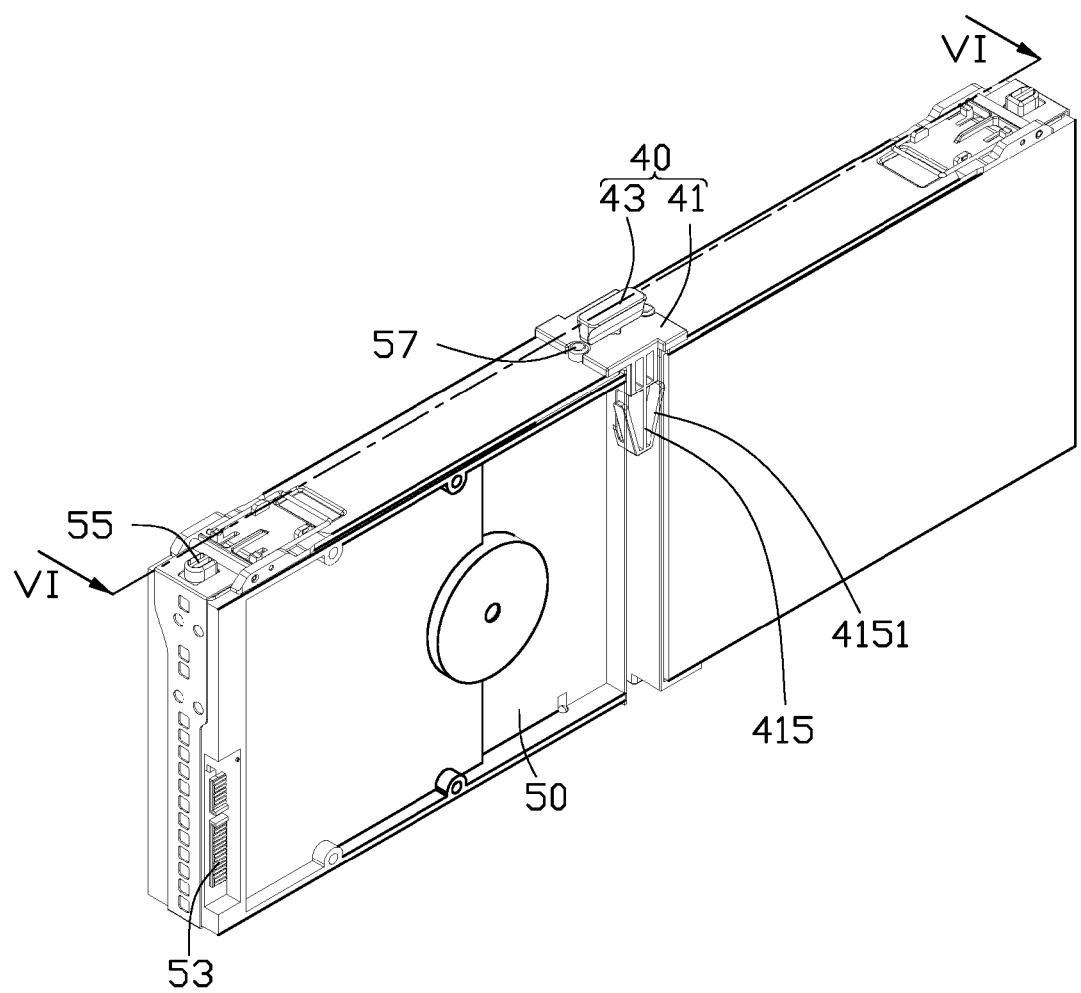
FIG. 4 is an isometric view of the hard disk drives and fastening apparatus of FIG. 2.
Figure 5:
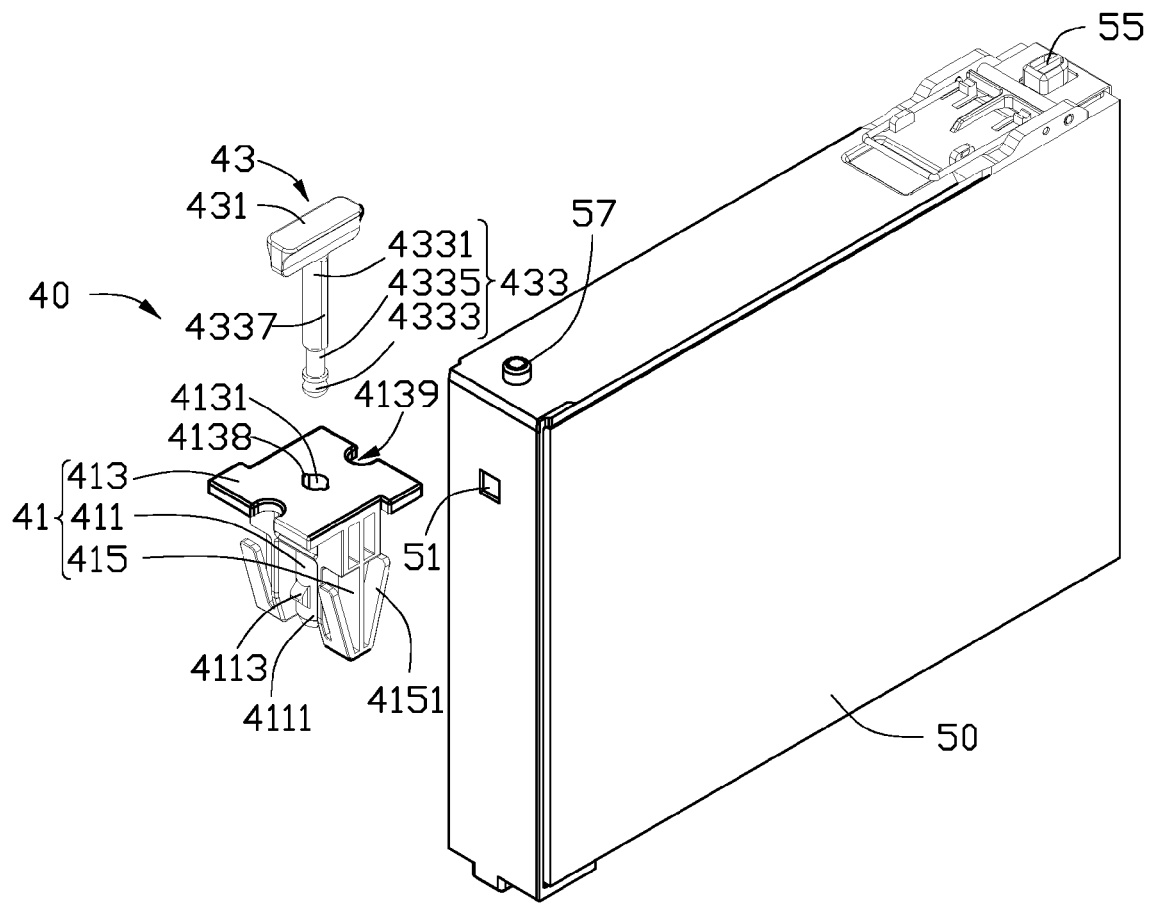
FIG. 5 is an exploded, isometric view of the components of FIG. 4.
Figure 6:
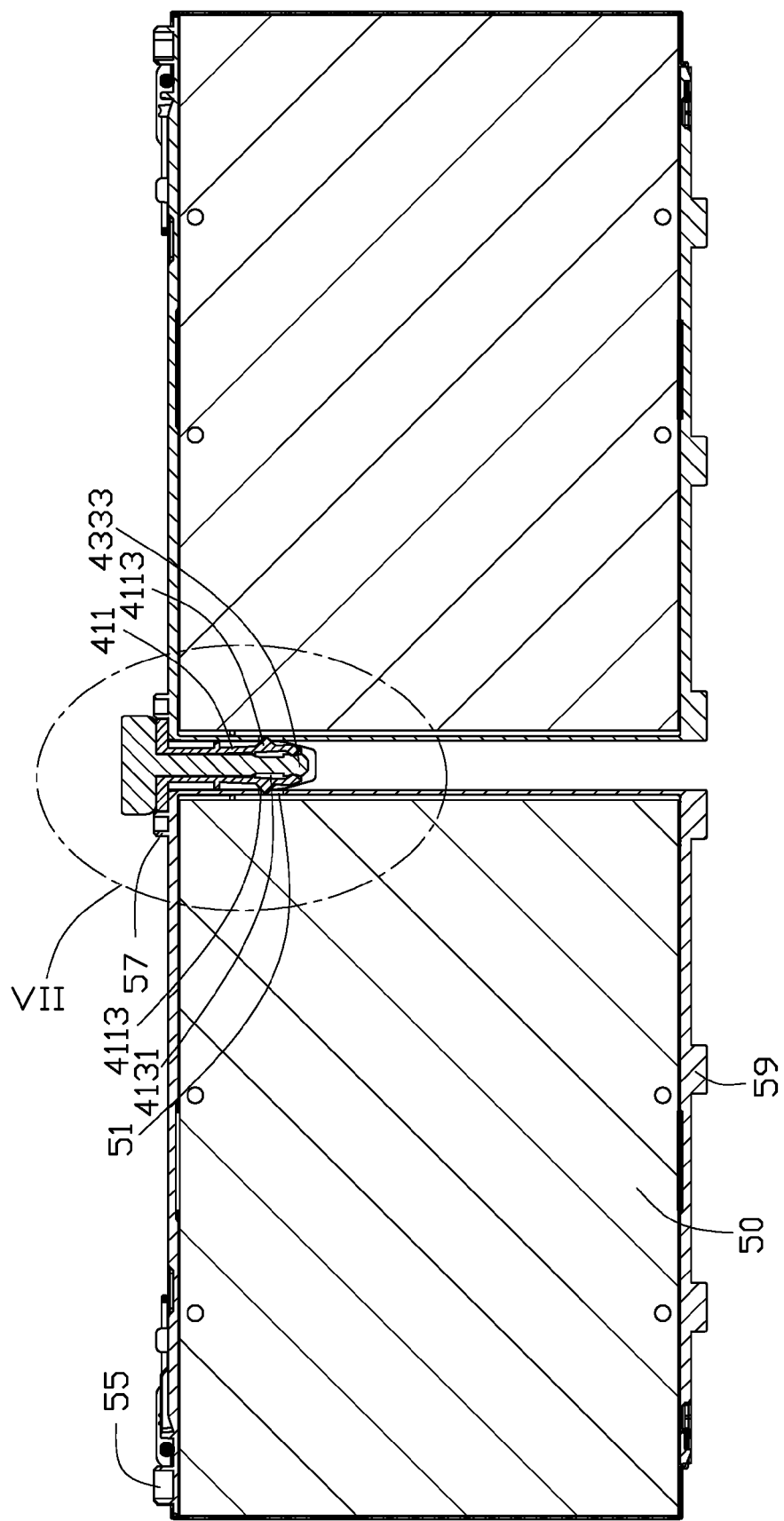
FIG. 6 is a sectional view taken along line VI of FIG. 4.

Referring to FIGS. 4-6, one end of each hard disk drive 50 defines an opening 51, and the other end of the hard disk drive 50 has an electrical connector 53. A raised protrusion 55 protrudes from the top of the hard disk drive 50, which is adjacent to the opening 51. A raised pillar 57 protrudes from the top of the hard disk drive 50, which is adjacent to the opening 51. A plurality of positioning protrusion 59 protrudes from a bottom end of the hard disk drive 50.

Figure 7:
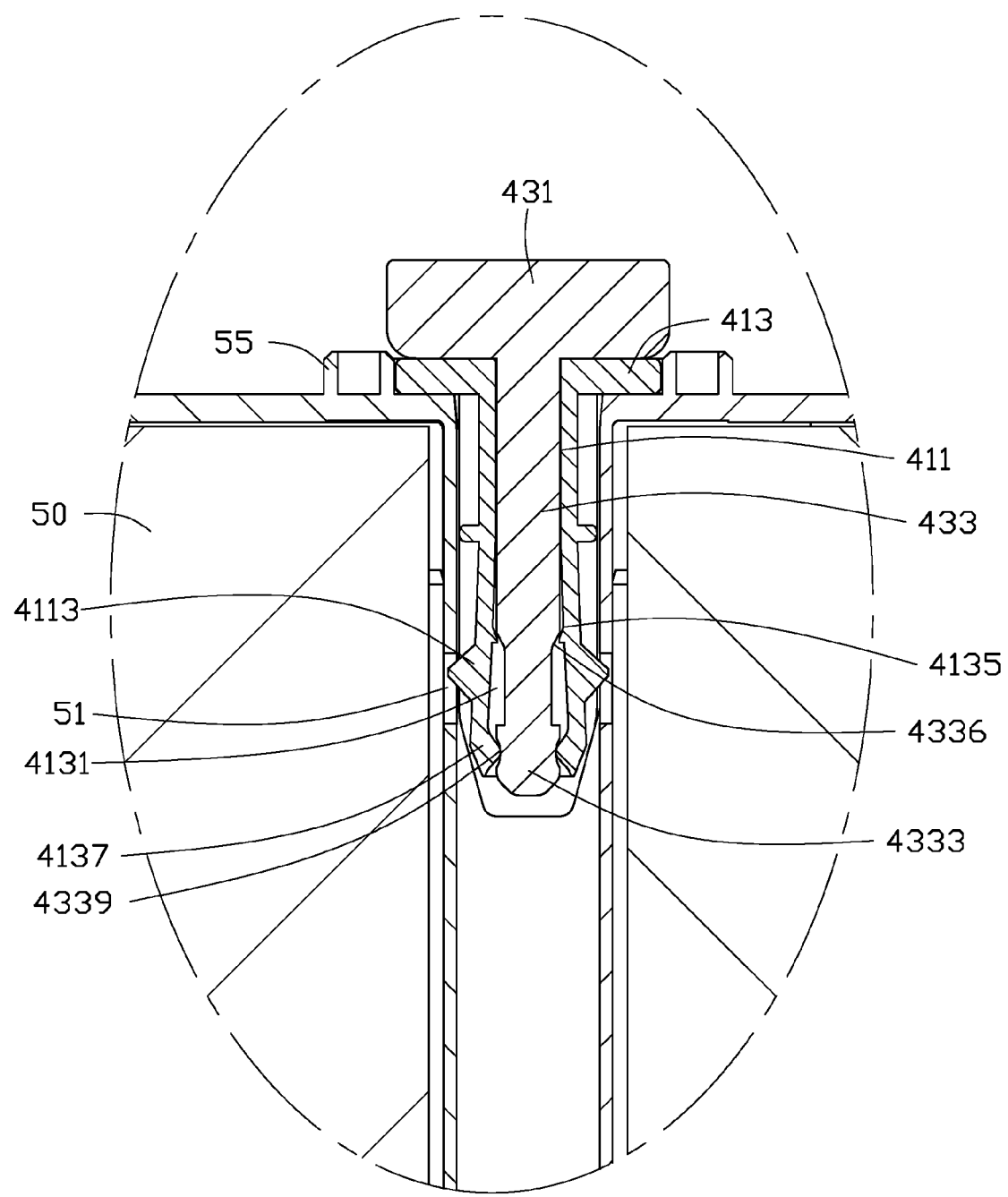
FIG. 7 is an enlarged view of encircled portion VII of FIG. 6.

Referring to FIGS. 5-7, the fastening apparatus 40 comprises a connecting member 41 and a fastening member 43. The connecting member 41 comprises a locking portion 411, a base plate 413 coupled to the top of the locking portion 411, and two stopping portions 415 which are coupled to a bottom end of the base plate 413 and located at two sides of the locking portion 411. Each stopping portion 415 comprises two flexible arms 4151 opposite to each other. The locking portion 411 comprises a connecting post 4111. Two locking protrusions 4113 protrude from two sides of the connecting post 4111. A middle portion of the base plate 15 defines a mounting hole 4131 which runs through a bottom end and the two sides of the connecting post 4111. A slide guide portion 4135 protrudes from an inside wall of a middle portion of the mounting hole 4131. A raised portion 4137 protrudes from an inside wall of a lower portion of the mounting hole 4131. Each side of the base plate 413 defines a locking hole 4139 opposite the two locking protrusions 4113. Two slide guide grooves 4138 are formed at the two sides of the mounting hole 4131.

The fastening member 43 comprises a pressing portion 431 and a resisting portion 433 coupled to the pressing portion 431. In at least one embodiment, the resisting portion 433 can be a cylindrical post. The resisting portion 433 comprises a post 4331, an urging portion 4333, and a neck portion 4335 coupled between the post 4331 and the urging portion 4333. The diameter of the neck portion 4335 is less than the diameter of the post 4331 and of the urging portion 4333. A sloping portion 4336 is formed at a connection between the post 4331 and the neck portion 4335. Two guide strips 4337 protrude from two sides of the post 4331. The urging portion 4333 defines a concave dent 4339 in an outside wall thereof.

Referring to FIG. 1 and FIG. 6, in assembly of the chassis, the connectors 53 of the hard disk drives 50 are inserted into the connectors 1511 of the backplanes 15. The raised protrusion 55 of each hard disk drive 50 is locked in the slots 1531 of the backplane 15, and the positioning protrusion 59 of each hard disk drive 50 are locked in the notches 111 of the bottom plate 11. The openings 51 of the two opposite hard disk drive 50 between the two backplanes 15 are opposite each other, and the openings 51 of the hard disk drives 50 between the backplanes 15 and the side plates 17 are opposite the openings 171 of the side plates 17. The hard disk drives 50 are positioned to the bottom plate 11. The locking portions 411 of the fastening apparatus 40 are inserted between two hard disk drives 50 between the two backplanes 15, and inserted between the hard disk drive 50 and the side plates 17. The base plates 413 contact the top of the two hard disk drives 50 at the top of the hard disk drives 50 and the side plates 17. The two locking protrusion 4113 of each locking portion 411 are opposite to the openings 51 of the two hard disk drives 50, or are opposite to the opening 51 of the hard disk drives 50 and the opening 171 of the side plate 17. The hard disk drives 50 and the side plates 17 are resisted by the flexible arms 4151 of the connecting members 41. The resisting portions 433 of the fastening members 43 are opposite the mounting holes 4131 of the connecting members 41, and the guide strips 4337 of the fastening members 43 are opposite to the slide guide grooves 4138 of the connecting members 41. The pressing portions 431 are pressed until dents 4339 of the urging portions 4333 urge the raised portions 4137 of the connecting members 41. The sloping portions 4336 of the fastening members 43 urge the slide guide portions 4135 of the connecting members 41. The urging portions 4333 and the sloping portions 4336 urge the lower portions of two sides of the locking portions 411 to elastically deform toward the outside, and the locking knobs 4113 of the connecting posts 4111 are locked in the openings 51 of the hard disk drives 50 and the openings 171 of the side plates 17. The raised pillars 57 of the hard disk drives 50 and the raised pillars 173 of the side plates 17 are locked in the locking holes 4139 of the base plates 413. The hard disk drives 50, positioned between the backplanes 15 and between the backplanes 15 and the side plates 17, are resisted by the fastening apparatus 40.

When the hard disk drives 50 are to be detached from the housing 10, the fastening members 43 are pulled out from the mounting holes 4131. The dent 4339 of the urging portion 4333 moves along the raised portion 4137, and is detached from the raised portion 4137. The sloping portion 4336 is moved along the slide guide portion 4135. The locking portion 411 recovers from its elastic deformation, and the locking protrusion 4113 of the connecting post 4111 is detached from the opening 51 of the hard disk drive 50 or from the opening 171 of the side plate 17. The hard disk drives 50 can then be pulled away from the backplane 15.

The embodiments shown and described above are only examples. Even though numerous characteristics and advantages of the present technology have been set forth in the foregoing description, together with details of the structure and function of the present disclosure, the disclosure is illustrative only, and changes may be made in the details, including matters of shape, size, and arrangement of the parts within the principles of the present disclosure, up to and including the full extent established by the broad general meaning of the terms used in the claims.

What is claimed is:

1. A chassis comprising:
    a housing comprising at least one backplane mounted in the housing and a side plate, the side plate defining an opening;
    at least one hard disk drive electrically coupled to the backplane, and defining an opening; and
    at least one fastening apparatus comprising:
        a connecting member comprising a connecting post, wherein a middle portion of the connecting post defines a mounting hole running through a bottom end and two sides of the connecting post, two locking protrusions protrude from two sides of the connecting post, and a raised portion protrude from an inside wall of the mounting hole; and
        a fastening member disassembly mounted in the connecting post, and comprising an urging portion;
    wherein the at least one fastening apparatus is coupled between the at least one hard disk drive and the side plate, the fastening member is mounted in the mounting hole, the raised portion is urged by the urging portions of the fastening member, a lower portion of the connecting post is formed an elastic deformation, and the locking protrusions of the connecting post are locked in the opening of the at least one hard disk drive and the opening of the side plate.

2. The chassis of claim 1, wherein the connecting member comprises a base plate coupled to a top end of the connecting post, the mounted hole is defined at a middle portion of the base plate, the base plate contact top ends of the at least one hard disk drive and the side plate, two sides of the base plate defines two locking holes, and two raised pillars separately protrude from the top ends of the at least one hard disk drive and the side plate configured to be locked in the locking holes.

3. The chassis of claim 2, wherein the fastening apparatus further comprises two stopping portions coupled to a bottom end of the base plate and located at two sides of the connecting post, each stopping portion comprises two flexible arms opposite to each other, and the at least one hard disk drive and the side plate are urged by the flexible arms.

4. The chassis of claim 1, wherein the urging portion defines a concave dent from an outside wall thereof to urge and lock the raised portion.

5. The chassis of claim 1, wherein the fastening member comprises a pressing portion and a resisting portion coupled to the pressing portion, the resisting portion comprises the urging portion, a post, and a neck portion coupled between the post and the urging portion, a slide guide portion protrudes from an inside wall of a middle portion of the mounting hole, a sloping portion is formed at a connection between the post and the neck portion, and the slide guide portion is urged by the sloping portion to form the elastic deformation of the connecting post.

6. The chassis of claim 1, wherein a raised protrusion protrudes from the top end of the at least one hard disk drive, the top end of the backplane defines at least one slot configured to lock the raised protrusion.

7. The chassis of claim 1, wherein the housing further comprises a bottom plate, the bottom plate defines at least one notch, and at least one positioning protrusion configured to be locked in the notch protrudes from a bottom end of the at least one hard disk drive.

8. A chassis comprising:
a housing comprising at least two backplanes mounted in the housing;
at least two hard disk drives electrically coupled to the backplanes, and each defining an opening; and
at least one fastening apparatus comprising:
a connecting member comprising a connecting post, wherein a middle portion of the connecting post defines a mounting hole running through a bottom end and two sides of the connecting post, two locking protrusions protrude from two sides of the connecting post, and a raised portion protrudes from an inside wall of the mounting hole; and
a fastening member disassembly mounted in the connecting post, and comprising an urging portion;
wherein the at least one fastening apparatus is coupled between the two hard disk drives, the fastening member is mounted in the mounting hole, the raised portion is urged by the urging portions of the fastening member, a lower portion of the connecting post is formed an elastic deformation, and the locking protrusions of the connecting post are locked in the openings of the two hard disk drives.

9. The chassis of claim 8, wherein the connecting member comprises a base plate coupled to a top end of the connecting post, the mounted hole is defined at a middle portion of the base plate, the base plate contact top ends of the two hard disk drives, two sides of the base plate defines two locking holes, and two raised pillars are separately protruded from the top ends of the two hard disk drives configured to be locked in the locking holes.

10. The chassis of claim 9, wherein the fastening apparatus further comprises two stopping portion coupled to a bottom end of the base plate and located at two sides of the connecting post, each stopping portion comprises two flexible arms opposite to each other, and the at least two hard disk drives are urged by the flexible arms.

11. The chassis of claim 8, wherein the urging portion defines a concave dent from an outside wall thereof to urge and lock the raised portion.

12. The chassis of claim 8, wherein the fastening member comprises a pressing portion and a resisting portion coupled to the pressing portion, resisting portion comprises the urging portion, a post, and a neck portion coupled between the post and the urging portion, a slide guide portion protrudes from an inside wall of a middle portion of the mounting hole, a sloping portion is formed at a connection between the post and the neck portion, and the slide guide portion is urged by the sloping portion to form the elastic deformation of the connecting post.

13. The chassis of claim 8, wherein a raised protrusion protrudes from the top end of each hard disk drive, the top end of the backplane defines at least one slot configured to lock the raised protrusion.

14. The chassis of claim 8, wherein the housing further comprises a bottom plate, the bottom plate defines at least one notch, and at least one positioning protrusion configured to be locked in the notch protrudes from a bottom end of each hard disk drive.

15. A fastening apparatus configured to be coupled between two hard disk drives, the fastening apparatus comprising:
a connecting member comprising a connecting post, wherein a middle portion of the connecting post defines a mounting hole running through a bottom end and two sides of the connecting post, two locking protrusions protrude from two sides of the connecting post, and a raised portion protrudes from an inside wall of the mounting hole; and
a fastening member disassembly mounted in the connecting post, and comprising an urging portion;
wherein the fastening apparatus is coupled between the two hard disk drives, the fastening member is mounted in the mounting hole, the raised portion is urged by the urging portions of the fastening member, a lower portion of the connecting post is formed an elastic deformation toward outside, and the locking protrusions of the connecting post are locked in the hard disk drives.

16. The fastening apparatus of claim 15, wherein the connecting member comprises a base plate coupled to a top end of the connecting post, the mounted hole is defined at a middle portion of the base plate, the base plate contact top ends of the two hard disk drives.

17. The fastening apparatus of claim 16, wherein the fastening apparatus further comprises two stopping portion coupled to a bottom end of the base plate and located at two sides of the connecting post, each stopping portion comprises two flexible arms opposite to each other, and the two hard disk drives are urged by the flexible arms.

18. The fastening apparatus of claim 15, wherein the urging portion defines a dent concaved from an outside wall thereof to urge and lock the raised portion.

19. The fastening apparatus of claim 15, wherein the fastening member comprises a pressing portion and a resisting portion coupled to the pressing portion, resisting portion comprises the urging portion, a post, and a neck portion coupled between the post and the urging portion, a slide guide portion protrudes from an inside wall of a middle portion of the mounting hole, a sloping portion is formed at a connection between the post and the neck portion, and the slide guide portion is urged by the sloping portion to form the elastic deformation of the connecting post.

* * * * *